United States Patent [19]

Hindrich et al.

[11] Patent Number: 4,870,897
[45] Date of Patent: Oct. 3, 1989

[54] PANCAKE FRYING APPARATUS

[76] Inventors: Emilia Hindrich; Hermann Knipscheer, both of 2815 Carnation Ave., Baldwinrk, N.Y. 11510

[21] Appl. No.: 112,318

[22] Filed: Oct. 22, 1987

Related U.S. Application Data

[63] Continuation-in-part of Ser. No. 928,364, Nov. 18, 1986, abandoned.

[51] Int. Cl.$^4$ ............................................. A47J 37/12
[52] U.S. Cl. ....................................... 99/404; 99/407; 99/416; 99/443 C; 426/438
[58] Field of Search .................. 99/404, 407, 409, 416, 99/443 C, 336; 83/580; 426/438

[56] References Cited

U.S. PATENT DOCUMENTS

| | | | |
|---|---|---|---|
| 2,709,955 | 6/1955 | Hunter | 99/404 |
| 3,993,788 | 11/1976 | Longenecker | 99/443 C |
| 4,442,131 | 4/1984 | Nagy et al. | 83/580 |
| 4,584,931 | 4/1986 | Feehan | 99/404 |

*Primary Examiner*—George Yeung
*Attorney, Agent, or Firm*—Darcy, Donovan & Coleman

[57] ABSTRACT

Cartridges containing a prefabricated mixture of grated potato, onion, egg, farina, chopped chives, salt and pepper are the source for the raw potato pancakes, which are sliced off from the mixture to be fried in vegetable or artificial cooking oil. The raw potato pancakes are moved by two endless wire mesh belts through two consecutive skillets with cooking oil, the level of which is adjustable and automatically maintained, to be fried golden brown on both sides. At the end of the last wire mesh belt the fried potato pancakes slip over a slide directly onto serving plates for immediate consumption. The slicing and frying process happens fully automatically after entering the amount of servings into a microcomputer built-in to the apparatus housing.

9 Claims, 12 Drawing Sheets

SECTION A-A

FIG.1 SECTION A-A

SECTION B-B

FIG. 2

SECTION C-C
FIG. 3

SECTION D-D

FIG. 4

SECTION E-E

FIG.5

SECTION B-B

FIG. 7

SECTION C-C

FIG. 8

SECTION D-D

FIG. 9

SECTION E-E

PANCAKE FRYING APPARATUS

This application is a continuation in-part of the co-pending U.S. patent application Ser. No. 928,364, filed Nov. 18, 1986, entitled "The Automatic Potato Pancake Maker.", now abandoned.

BACKGROUND OF THE INVENTION

This invention relates to an apparatus and process for frying pancakes, particularly for the mass production of fresh, finished fried potato pancakes.

Potato pancakes as a delicacy are widely prepared, especially in German households and also at outdoor stands of open air festivals. Every housewife and cook has his or her own recipe for the preparation of the product made.

U.S. Pat. No. 4,584,931 to Feehan discloses an apparatus for frying one side of a potato pancake for subsequent freezing and packing. The pancakes are only partially cooked because the intent is to only blanch the product to hold it together for freezing and later finishing and consumption elsewhere.

U.S. Pat. No. 3,251,293 to Wilhelm, et al. discloses devices for frying edible goods, such as meats. The edible goods are transported through the device on a single looped conveyor having an upper horizontal course and a lower horizontal course, which conveyor includes a series of longitudinally spaced, preferably blade-shaped elements, which entrain the goods to be fried. The entraining blades hold the goods over a first frying pan beneath the upper course of the conveyor, then through a stationary guide channel which follows the conveyor along its turn from the upper horizontal course to the lower horizontal course, and then over a second frying pan beneath the conveyor's lower course so as to allow roasting of the top side of the goods by a second lower, stationary frying pan. Sprinklers above the frying pans supply hot fat for the frying.

U.S. Pat. No. 4,176,590 to Kochan discloses an apparatus for flipping doughnuts on a conveyor belt while they are being fried.

U.S. Pat. Nos. 3,696,735 and 3,794,745 to Boertje, et al. disclose a zigzag slide for frying foods in which both the foods and the frying oil tumble down the slide during cooking.

SUMMARY OF THE INVENTION

An object of this invention is to provide an apparatus for producing fresh fried pancakes, and in particular potato pancakes, in restaurants and fast food places for immediate consumption.

A further object of this invention is to provide an apparatus for consistently cooking both sides of pancakes, or other food products of similar consistency, in a controlled manner and in mass production.

Another object of this invention is to provide an automatic frying apparatus which is computer controlled requiring the minimum of human intervention.

Yet another object of this invention is to provide a frying apparatus which will automatically process and cook food articles which are contained in prepackaged containers or cartridges. In particular, it is an object of this invention to provide an apparatus which will consistently make uniformly sized and uniformly cooked pancakes from raw pancake mixture that is vacuum packed in easy to store cartridges suitable for transportation over long distances to those places where the apparatus is installed. Preparing and packing the mixture in specially equipped food processing plants will guarantee uniform consistency of the raw product over all the time of production.

Yet still another object of this invention is to provide a cooking apparatus which automatically adjusts the level of the cooking oil as oil is absorbed or otherwise lost during use.

Another object of this invention is to provide a frying apparatus in which the containers or pans for holding the cooking oil can be easily and safely removed for cleaning.

Briefly, the apparatus and process of the invention serve to process, and in particular cook, food articles, such as raw pancake mixture. The apparatus includes an automatic transport device for pushing the mixture out of the cartridges and into an automatic cutting mechanism for slicing the raw-mixture into thin, preferably about 1/4 inch thick, pancakes. The sliced raw pancakes are automatically deposited upon a first movable surface, preferably an endless wire mesh belt, for transport past a a first frying means preferably for transport through a skillet containing heated cooking oil, so as to fry a first side of the pancake. The partially cooked pancakes are then transferred to a second movable surface, again preferably an endless wire mesh belt, for transport preferably through another skillet containing heated cooking oil. The partially cooked pancakes are automatically flipped before entering the second skillet so that they are then fried on the other side. Means for removing the cooked pancakes from the second wire mesh belt are also provided.

The skillets, in conjunction with a heat source, preferably temperature-controlled heating coils, house and heat the cooking oil. A refrigerant unit is provided for cooling the cooking oil contained in the skillets when cleaning of the skillets and/or changing of the cooking oil is required. Consistency of cooking is enhanced by a refilling container with level indicator which automatically maintains a constant cooking oil level. Control of the degree of cooking is enhanced by, inter alia, means for adjusting the levels of the skillets with respect to the wire mesh belts so as to allow adjustment of the extent to which the moving pancakes are immersed in the heated cooking oil. A built-in control panel with microprocessor or minicomputer monitors and automatically controls the preparing process; and an insulated stainless steel housing encloses the above-mentioned components These and other objects and advantages of the invention will become more apparent from the following detailed description of the invention taken in conjunction with the accompanying drawings.

DESCRIPTION OF THE DRAWINGS

FIG. 1 illustrates heating table 48 in two different vertical positions, a lower maintenance position on the left side of the figure, and an upper operating postion on the right side of the figure.

FIG. 2 illustrates heating table 48 in two different vertical positions, a lower maintenance position on the left side of the figure, and an upper operating postion on the right side of the figure.

DESCRIPTION OF THE PREFERRED EMBODIMENTS

For ease of description, the preferred embodiment of the invention is described in the procedural sequence of making the product and is divided into a mechanical section and a control section.

1. Mechanical Section

Figure 1:
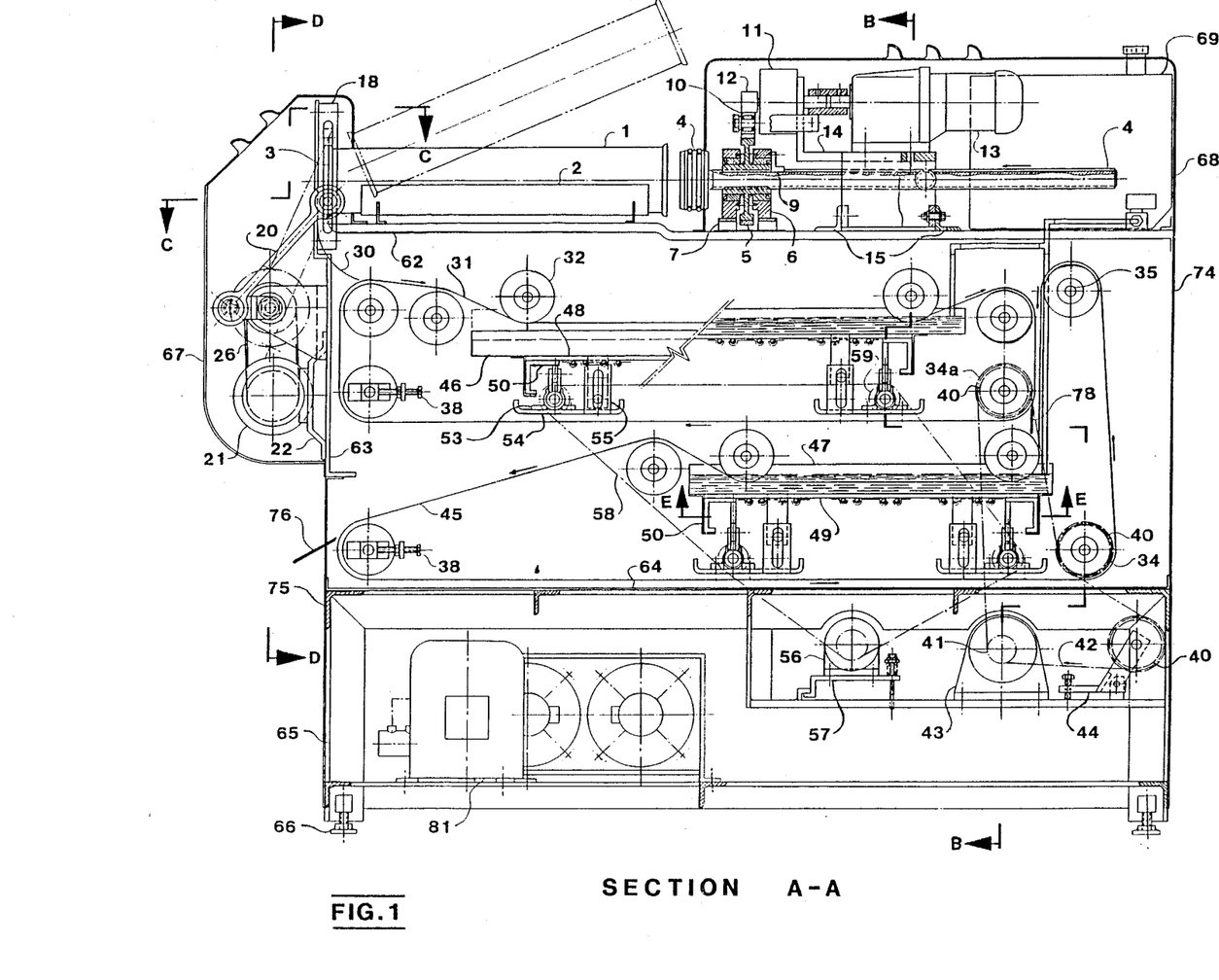
FIG. 1 is a schematic cross-sectional view of the preferred embodiment of this invention and shows a view taken along line A—A of FIG. 2.

Referring to FIG. 1, the frying apparatus, illustrated as one assembled unit in FIG. 1, is adapted to be supplied with one or more, preferably three, cartridges 1, containing the readily prepared raw potato pancake mixture.

The cartridges 1 preferably are the same type as conventionally used for food packaging, but custom made as to size, e.g., five inches in diameter and 26 inches long. The shell is made from cardboard, plastic, or thin metal, coated on the inside with a plastic layer, and closed vacuum tight at both ends with easily removable covers.

The raw potato pancake mixture, prepared in specially equipped food processing plants, vacuum packed and shipped in the previously described cartridges 1, is made from finely grated potatoes (1–2 mm), onion, eggs, farina, chopped chives, salt and pepper.

Figure 3:
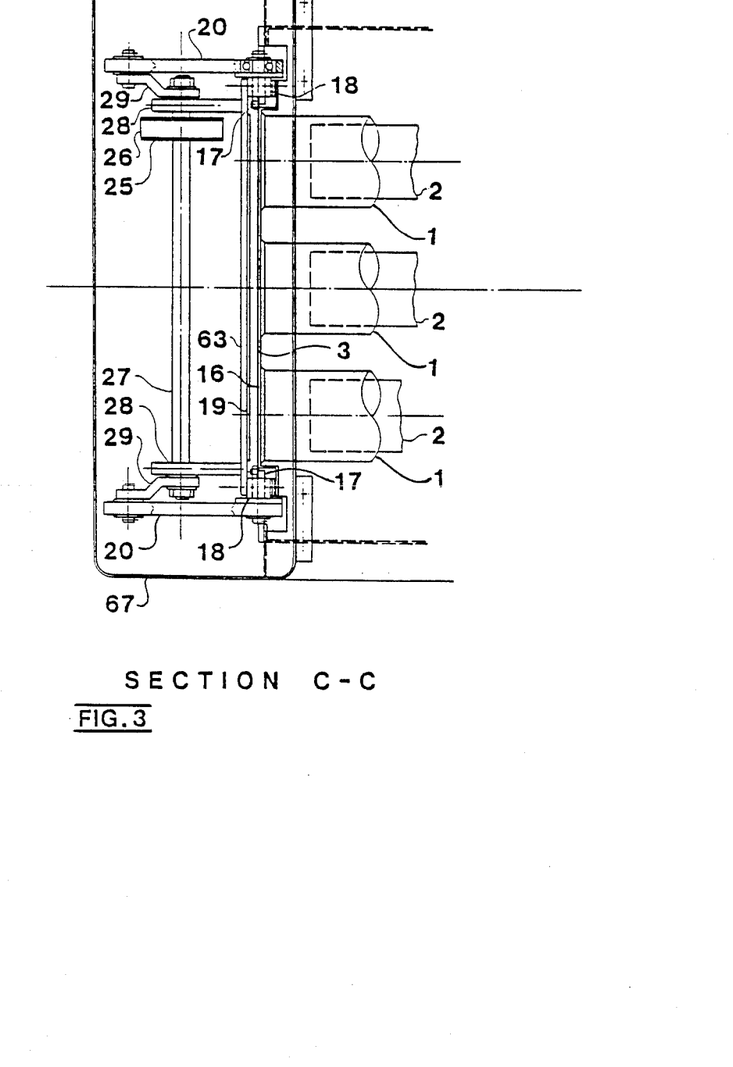
FIG. 3 is an enlarged partial view of the cutting mechanism and shows a section view taken along line C—C of FIG. 1.

Referring to FIGS. 1 and 3, the automatic transport mechanism includes receptacles or moldings 2 which are provided for holding the cartridges 1. Pistons 4 are mounted adjacent to the moldings 2 for automatically transporting predetermined portions of the mixture from the cartridge 1 to the cutting mechanism located on the opposite side of the cartridges from the automatic transport mechanism. The operator of the apparatus removes the covers on both ends of the three cartridges 1 and places them onto the moldings 2 with one side of the cartridges against wall 3 (FIG. 1 and 3). The piston 4, having screwed spindles, is adapted to slide into the cartridges 1 and push the mixture through the cartridges and through the 5½ inches diameter openings in wall 3 until the mixture touches wall 19. (FIG. 3). Walls 3 and 19 preferably are ¼ inch apart.

Figure 2:
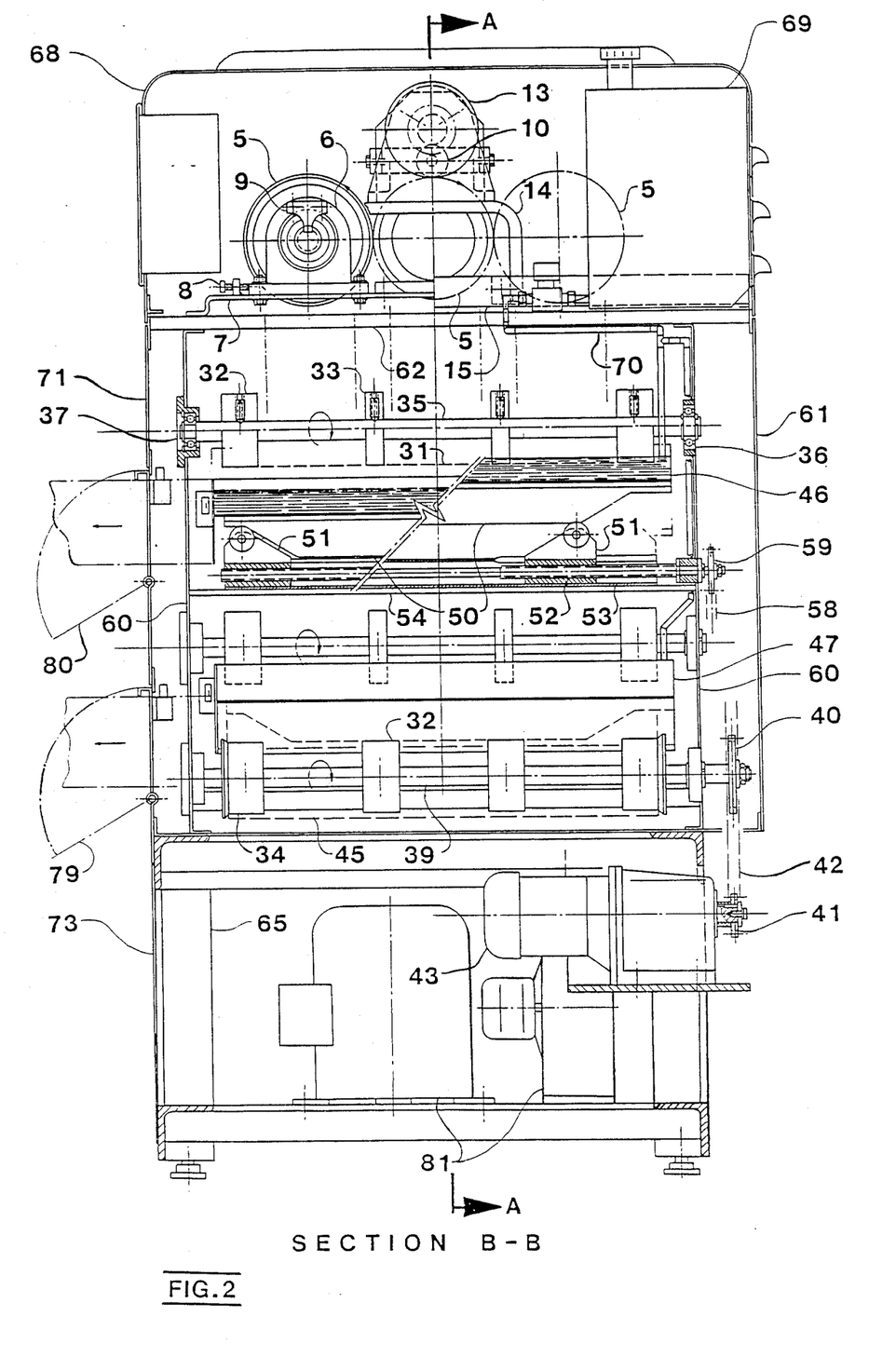
FIG. 2 is a schematic cross-sectional view and shows a view taken along line B—B of FIG. 1.

Referring to FIGS. 1 and 2, the three pistons 4 are driven by one gearmotor 13, similar to the types made by Bauer, W. Germany, one electromagnetic clutch 11, similar to the types made by Deltran, Buffalo, two rubberized rollers 10 and 12, and three rubberized drive wheels 5, each drive wheel having a bearing block 6. Keys 9 mounted to the bearing blocks 6 prevent the piston spindles from rotating. The bearing blocks 6 of the drive wheels 5 are mounted to a base support 7, and the bearings of the two outer drive wheels are pushed against each other by chucks 8. By doing so, the rubberized surfaces of the three drive wheels 5 are being pushed against each other, and by driving the middle one of the three wheels all three are being driven by surface contact only. The drive wheels 5 transfer their own rotating motion into the linear motion of the piston spindles 4.

The speed of the gearmotor 13 is variable and reversible, so that the pistons 4 can be driven in and out of the cartridges 1 at different speeds.

Figure 4:
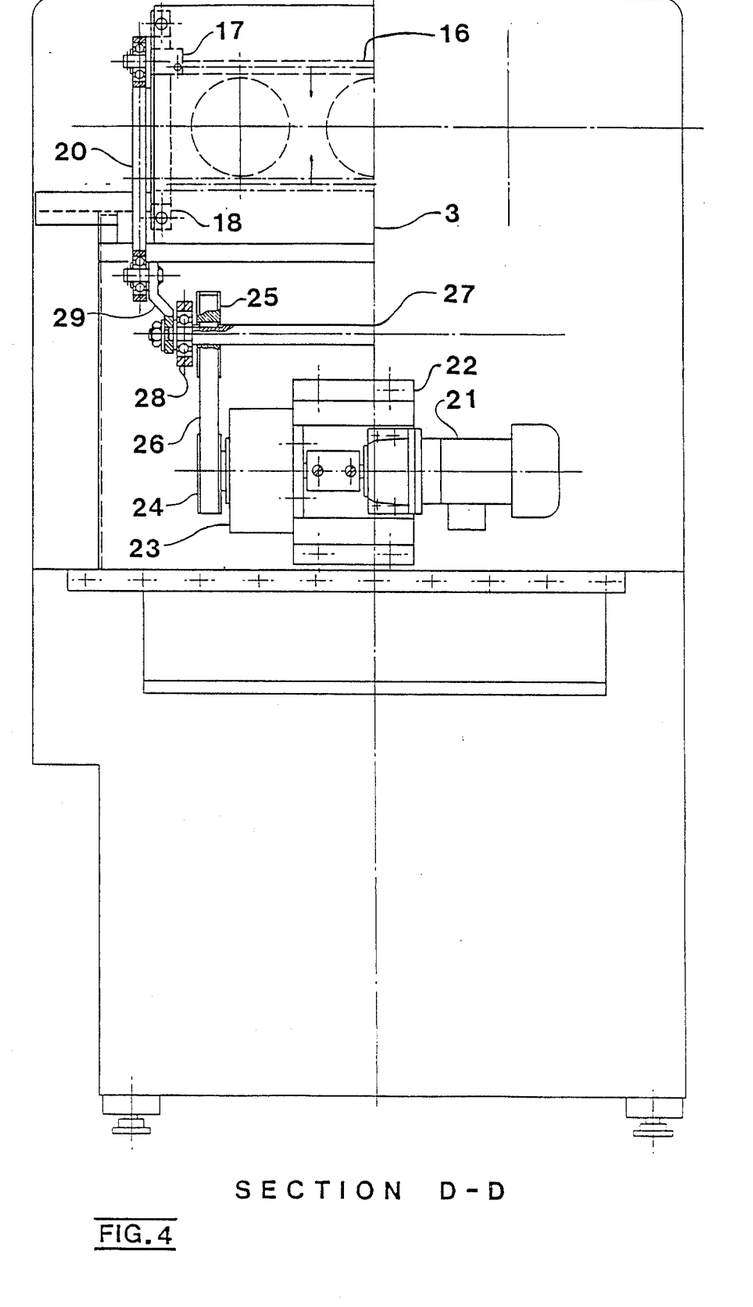
FIG. 4 is a partial view of the cutting mechanism and shows a section view taken along line D—D of FIG. 1.

Referring to FIGS. 1, 3, and 4, the automatic cutting mechanism includes a knife 16 which cuts off simultaneously three ¼ inch thick slices of the pancake mixture, immediately when the mixture touches the wall or plate 19. The knife 16 is set into motion by an eccentric lever mechanism, consisting of two arms 20, two eccentric levers 29, one axle 27, and two bearings 28 mounted on baseplate 63.

Referring especially to FIG. 4, a gearmotor 21, similar to the types made by Bauer, W. Germany, drives over an electromagnetic clutch 23, similar to the types made by Deltran, Buffalo, a belt transmission 24, 25, and 26, and the previously described lever mechanism. The knife 16 is held and guided by means of members 17 and 18.

Referring to FIG. 1, a first movable surface for transporting pancakes, which surface forms a course having at least three portions, preferably an endless wire mesh belt 31 coated with a conventional non-stick substance, such as Teflon, is provided to transport the slices of raw pancake to the first heating section. The wire belts 31 and 45 are driven by one chain 42 and relating sprockets 40 (FIGS. 1 and 2), and one gearmotor 43 with chain-tension device 44. The slices of raw pancake are transported by means for placing a raw pancake upon the first movable surface at a first portion of its course; preferably they glide down over slide 30, which also may be coated with a conventional non-stick substance, such as Teflon, onto the upper wire mesh belt 31. Subsequently they are transferred to the a second movable surface for transporting a pancake which forms a course having at least three portions, exemplarily the lower wire mesh belt 45 which also is coated with Teflon. Referring to FIGS. 1 and 2, the wire mesh belts 31 and 45 are guided by rollers 32, 33, and 34 on roller shafts 35 and 39, and their bearings 36 and 37. The wire mesh belts 31 and 45 are kept under tension by chucking devices 38.

Referring to FIGS. 1 and 2, the means for frying the pancake, operatively disposed adjacent to a second portion of the course of the first movable surface, and means for frying the pancake, operatively disposed adjacent to the second portion of the course of the second movable surface includes upper and lower skillets 46 and 47 containing cooking oil, which skillets rest upon heating tables 48 and 49. Each heating table 48, 49 is connected to an adjusting device, described below. The upper and lower wire mesh belts 31 and 45 are guided through the cooking oil by means of the rollers or pulleys 32. Raising or lowering the skillets 46 and 47, by moving the upper 48 and lower 49 heating tables up or down, by means of the adjusting devices 51, 52, and 53 below both tables (shown only blow the upper table for clarity), raises or lowers the cooking oil levels above the wire mesh belts 31 and 45. The heating tables 48 and 49 thus have two stages, a lower maintenance stage and an upper operating stage. The preferred cooking oil level in the upper and lower frying skillets 46 and 47 is about 1/16 inch above the wire mesh belts 31 and 45.

The upper and lower adjusting devices 51-53 are driven by one chain 58 and related sprockets 59, and one gearmotor 56 mounted on a chain-tension device 57.

Referring to FIG. 1, the raw pancake slices laying on the upper wire mesh belt 31 are conveyed through the upper frying skillet 46, containing the hot cooking oil. At this first step of the process, the raw potato pancakes are fried until only the side contacting the oil is golden brown. At the end of the upper frying skillet 46, the pancakes, now finished fried from one side, are lifted out of the oil by means of the upper wire mesh belt 31.

Guided and held between the upper 31 and lower 45 wire mesh belts, which travel at the same speed inasmuch as they are driven by the same motor, the partially cooked pancakes are transported vertically down, and then, resting upon lower wire mesh belt 45, into the lower frying skillet 47. Means for removing the pancake from the first movable surface at the third portion of its course and placing the removed pancake upon the second movable surface are provided. For example, a member adjacent to the first wire mesh belt, and above part of the second wire mesh belt, impeding the continued passage of a pancake on the first wire mesh belt but allowing it to be carried by the second wire mesh belt, preferably a scrapper blade 78 behind the lower rear guide pulleys 34a assures that the pancakes detach from the upper wire mesh belt 31.

The above-described arrangement for transferring the pancakes from the first movable surface to the second movable surface also serves to turn the pancakes upside down.

In the lower skillet 47, the pancakes are fried golden brown on their other side. The lower skillet 47 is considerably shorter than the upper one 46 because the pancakes are partially cooked on their upper side while undergoing the frying process in the upper skillet 46.

The finished fried potato pancakes, now golden brown and crunchy on both sides, remain on the lower belt 45 for the time of transport between the points where they leave the lower skillet 47 by means for removing the cooked pancake from the third portion of the course of the second movable surface. For example, that is where they are scraped off from the belt by means of scraper 76 to exit the frying apparatus. Within this time the excessive oil will drip off from the potato pancakes and collect in the lower part of the apparatus which is slightly pitched and built-out as a dripping pan 64.

The upper and lower frying skillets 46 and 47 are removable for cleaning purposes, adjustable in height in their operational position, and heated or cooled depending on whether in production or prepared for maintenance. To accomplish the previously described functions, and referring to FIGS. 1 and 2, skillets 46 and 47 rest on tables 48 and 49. Clamps on both sides attached to the skillets are guided by rails 50 and hold the skillets firmly and tightly to the corresponding table 48 or 49.

The rails 50 which are themselves attached to the tables, are wedge-shaped on their front and rear end. Two roller blocks 51 under each rail 50 are adapted to slide towards or away from each other when driven by a rotating motion of the screwed spindle 52 with a left-hand thread on one end and a right-hand thread on the other. The oppositely directed motion of the roller blocks 51, guided on the wedge-shaped rails 50, lifts the table 48 or 49 and with it the skillets 46 or 47 up or down or in any position in between.

All four spindles 52 of the table-adjusting device for the upper and lower frying skillets 46 and 47 are driven by one chain 58 and related sprockets 59 at each spindle, and one gearmotor 56, similar to the types constructed by Bauer, W. Germany. The gearmotor 56 is mounted on baseplate 57 which also serves as a chain-tension device.

Figure 5:
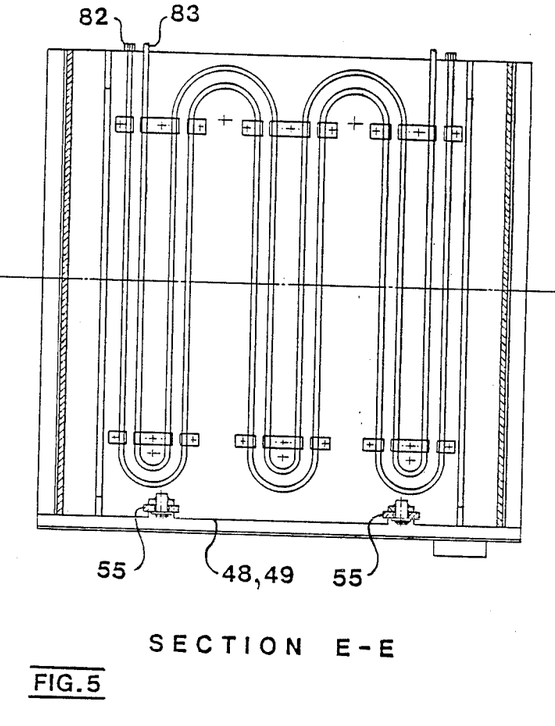
FIG. 5 is an enlarged view taken from under the lower frying pan and shows a view taken along line E—E of FIG. 1, which also applies to the upper frying pan, illustrating the arrangement of the heating and cooling coils.

Both frying skillets 46 and 47 and their tables 48 and 49 rest upon the previously described roller blocks 51 which are slidably mounted on traverses 54, which again are attached to the inner front and rear frame. Referring to FIGS. 1 and 5, two clamping devices 55 under each frying skillet 46 and 47, one part of the clamping device attached to the table 48 or 49 and one part to the traverse 54, allow the table 48 or 49 to be lifted up and down but prevent the table from being removed, while pulling out the skillets 46 and 47 for cleaning purposes.

Referring to FIG. 2, the means for maintaining the cooking oil level constant during use includes a reservoir 69 and oil supply pipes 70 from the reservoir 69 to the frying skillets 46 and 47. The cooking oil level in both frying skillets 46 and 47 is self-maintained by fixing the outlets of the oil supplying pipes 70 at the preferred cooking oil level. If the oil level lowers due to the frying process, an air gap between the outlets of the pipes 70 and the oil surface lets air enter into the cooking oil reservoir 69 and oil flow into the skillets 46 and 47 until the oil surface closes the air gap again.

Figure 6:
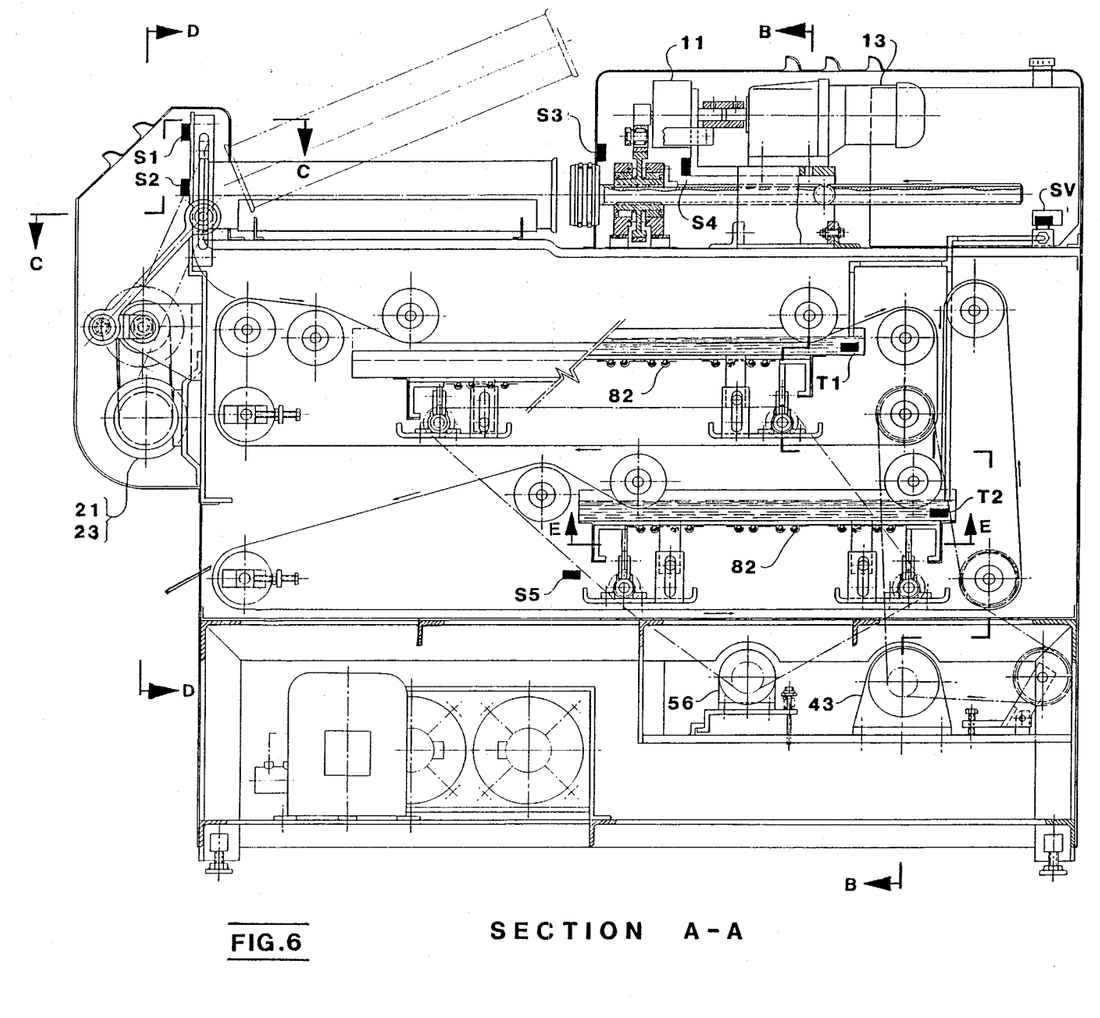
FIG. 6 shows the same view as FIG. 1 and identifies the location of the motor and control components of the preferred embodiment of this invention as listed under the Control Section of the description.

Referring to FIGS. 5 and 6, the frying and refrigerant means are now further described. Electric heating coils 82 and capillary cooling coils 83 are clamped to the underside of the tables 48 and 49. The heating coils 82 are for supplying an adjustable amount of heat, so as to maintain a temperature of about 350-400 degrees Fahrenheit, to the cooking oil. The cooling coils 83 are for cooling the cooking oil down to a nonhazardous temperature (about a maximum of 100 degrees Fahrenheit) if the skillets 46 and 47 have to be removed for cleaning. The refrigerant temperature is provided by a refrigerator unit 81.

Referring to FIG. 2, the inner frame 60, with its front and rear walls, carries the bearings 36 and 37 of the wire mesh belt rollers 32-34, and the traverses 54 of the upper and lower frying skillets 46 and 47, and is supported on a structural frame 65 on which the gearmotors 43 and 56, with their chain-tension devices 44 and 57, are mounted. The frame 65, and with it the entire apparatus, is horizontally levelled by means of device 66.

The inner frame 60 is closed on top with a double wall cover 62 on which the cartridge molding 2, the piston-bearing support 7, the steel angle 15 for holding the gearmotor support 14, and the cooking oil reservoir 69 are mounted. The front end of the cover 62 is bent upwards and becomes the registering wall 3 for the cartridges 1.

Referring to FIGS. 1 and 2, supporting wall 63 is attached to the outlet side of the inner frame 60 and onto it are mounted the support 22 for gearmotor 21, the bearing blocks 28 for the cutting mechanism, and the knife guides 18.

Figure 12:
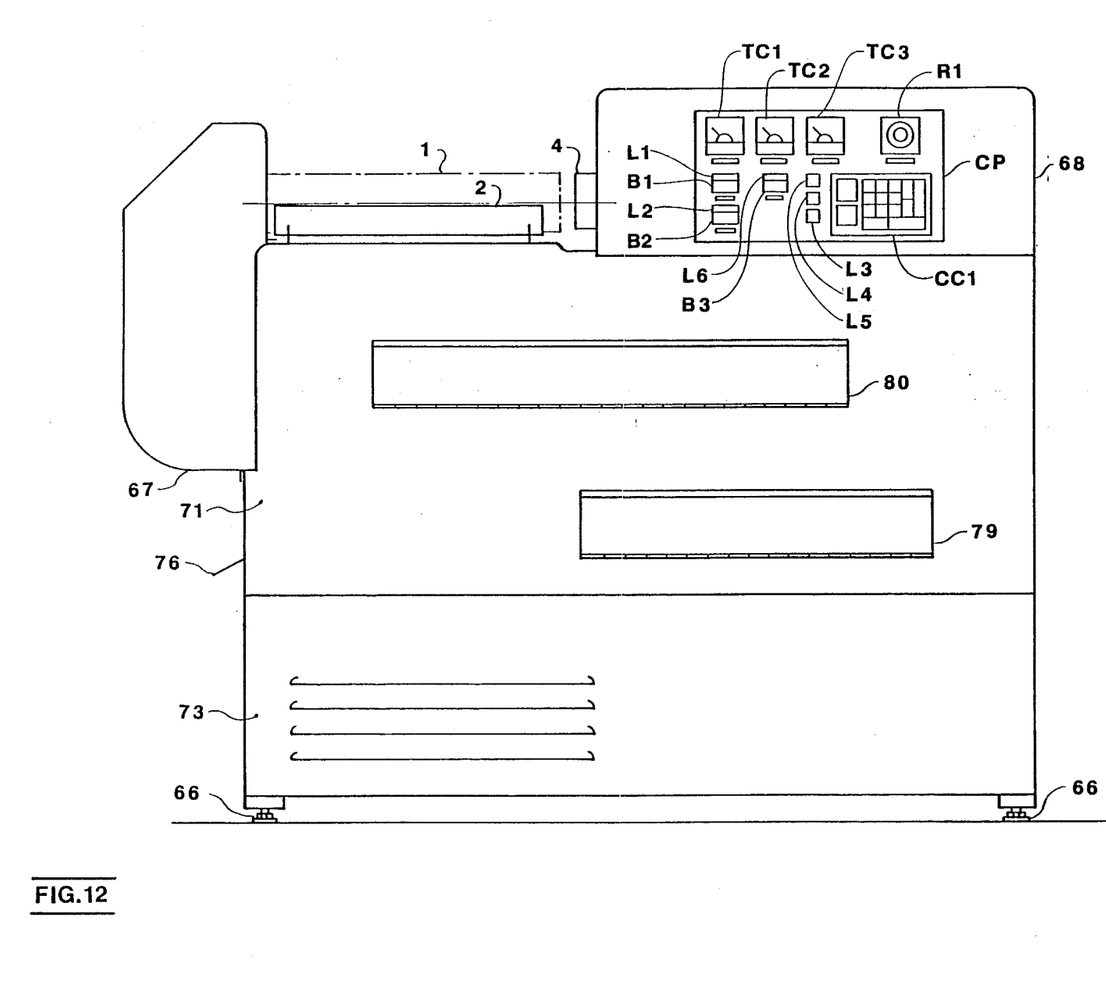
FIG. 12 is a partial view of the preferred embodiment of the invention.

Referring to FIG. 1, hoods 67 and 68 cover the cutting mechanism and the piston drive. Referring to FIGS. 1 and 2, all sides of the apparatus are enclosed by the insulated wall 61, 71, 73, 74, and 75. Referring to FIG. 12, doors 79 and 80 in the front wall 71 allow the removal of the upper and lower frying skillets 45 and 46 for cleaning.

Figure 11:
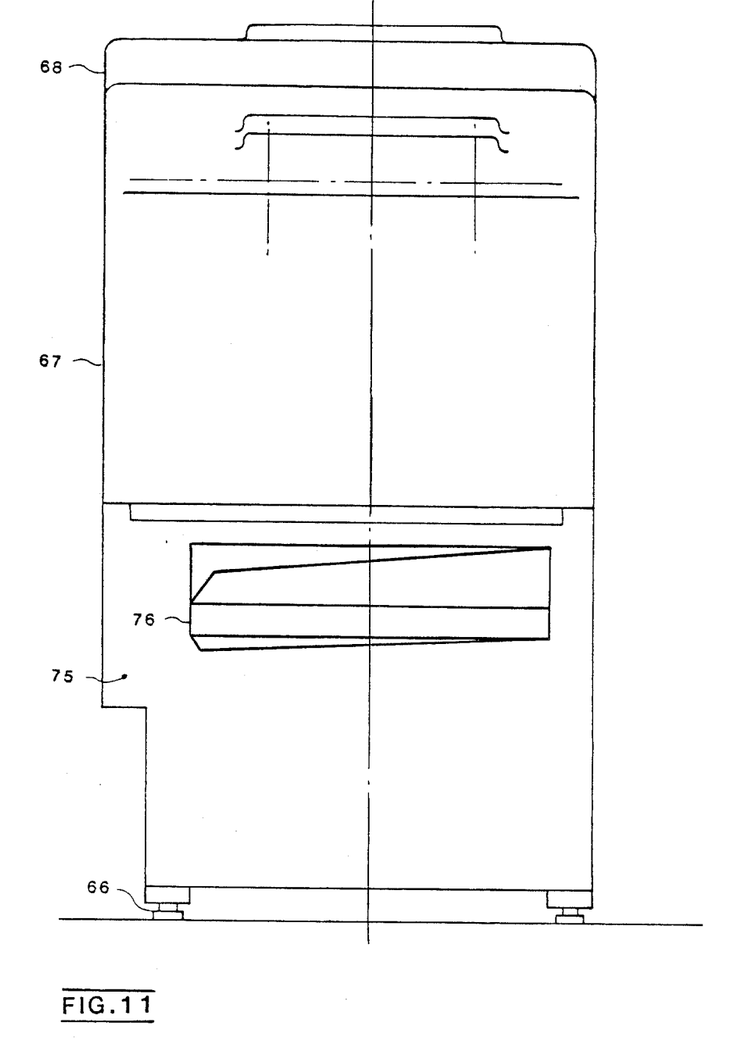
FIG. 11 is a side view of the preferred embodiment of the invention showing the exit for the cooked pancake.

Referring to FIGS. 11 and 12, recessed in hood 68 and facing the front side of the apparatus is the electric control panel with functions as described under the next section.

2. Control Section

Figure 7:
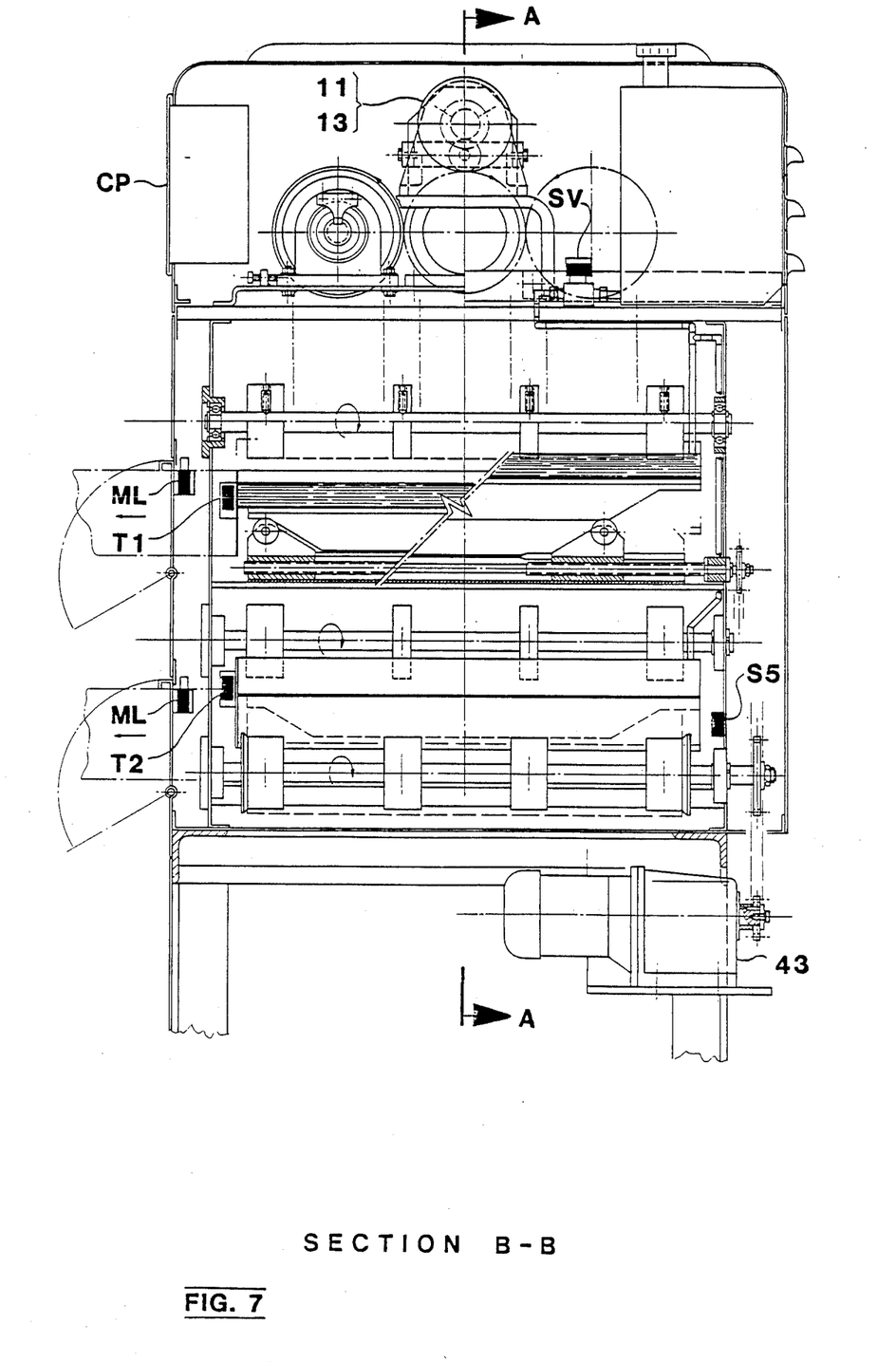
FIG. 7 shows the same view as FIG. 2 and fulfills the same purpose as FIG. 6.

Referring to FIGS. 1 and 2, the gearmotors 13, 21, 43, and 56 start after the main button B1 is pushed, and then the start button B2 of the control panel CP (FIGS. 7 and 12) is pushed. The gearmotor 56 operates a chain drive 58 rotating the two spindles 52, located under each of the upper and lower skillets 46 and 47, and moving them synchronically from the maintenance position up into the frying position. Referring to FIGS. 6 and 7, the microswitch S5 switches the gearmotor 56 off, starts the power to the electric heating coils 82 (FIG. 5), and opens the solenoid valve SV (FIG. 6) of the cooking oil reservoir 69 (FIG. 1) so that a constant oil level in the upper and lower skillets will be maintained.

Only if the temperature sensors T1 and T2 confirm the correct cooking oil temperature (ca. 375 F) as previously adjusted with the temperature controls TC1 and TC2 of the control panel, the automatic operating process starts.

Figure 8:
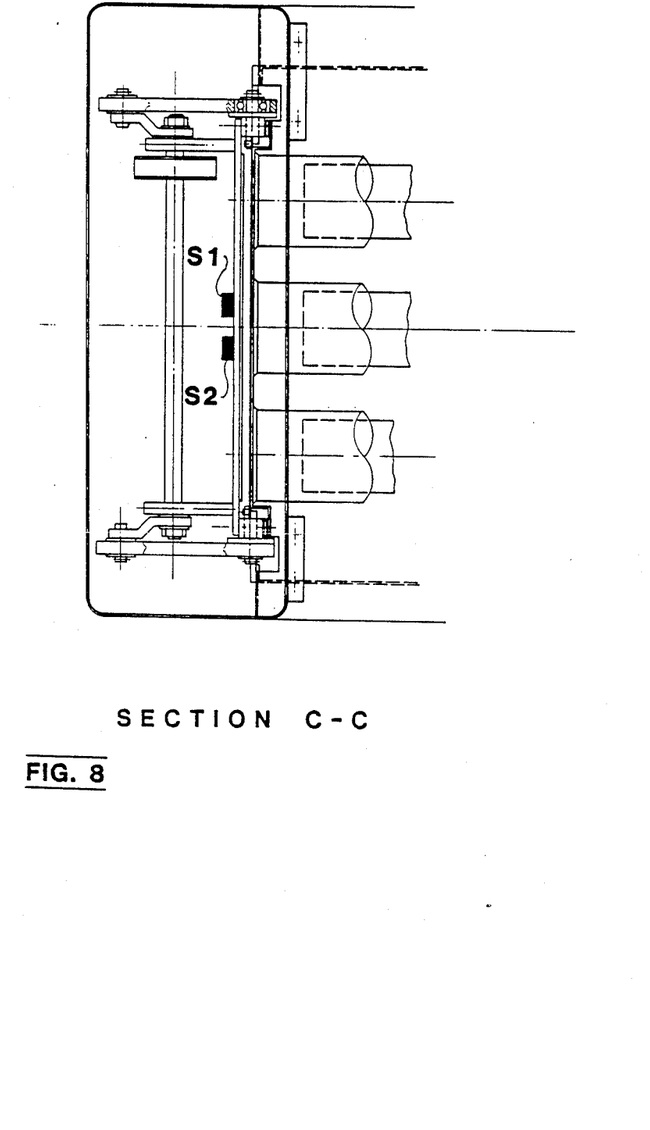
FIG. 8 shows the same view as FIG. 3 and fulfills the same purpose as FIG. 6.
Figure 9:
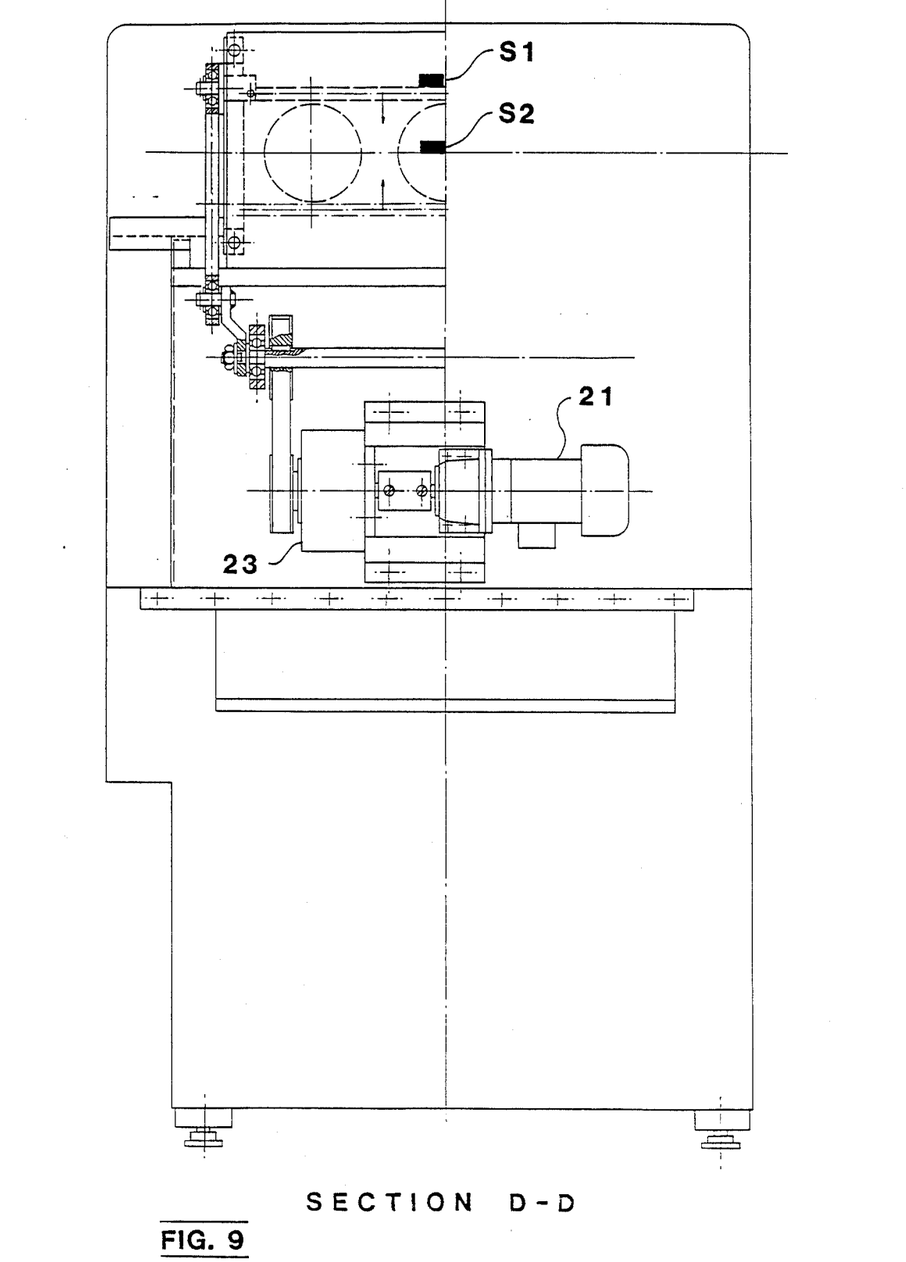
FIG. 9 shows the same view as FIG. 4 and fulfills the same purpose as FIG. 6.
Figure 10:
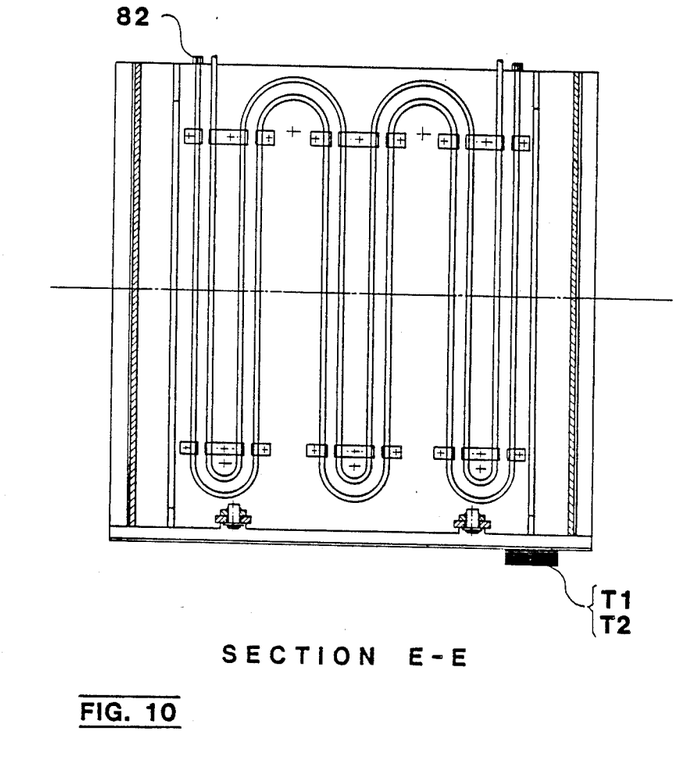
FIG. 10 shows the same view as FIG. 5 and fulfills the same purpose as FIG. 6.

Referring to FIG. 1, the electromagnetic clutch 11 couples in, the gearmotor 13 drives the three pistons 4 into the three cartridges 1 on one side, until on the other side the mixture operates the microswitch S2 (FIG. 6, 8, and 9). Subsequently, the electromagnetic clutch 11 uncouples. Then, the electromagnetic clutch 23 (FIG. 4) couples in and the gearmotor 21 (FIG. 4) operates the knife 16 (FIG. 3 and 4). The knife cuts off simultaneously three slices of the raw potato pancake mixture as previously described.

After the cutting process, the knife 16 (FIG. 3 and 4) moves back to the upper starting position by means of the microswitch S1 (FIG. 6, 8, and 9), which disconnects the clutch 23 (FIG. 4). Depending on the number of services programmed into the computer CC1 of the control panel, the process of switch/clutch operation works automatically by giving the command back to the clutch 11.

Subsequently after the three pistons 4 (FIG. 1) have pushed all of the pancake mixture out of the three cartridges 1 (FIG. 1), the microswitch S4 (FIG. 6), operates the gearmotor 13 (FIG. 1 and 2) into reverse and stops the gearmotor 21 after the microswitch S1 signals the knife 16 in the upper position. The pistons 4 drive out of the cartridges 1 and operate microswitch S3 (FIG. 6) at the pistons' end-point. Clutch 11 uncouples, the gearmotor 13 switches off and an audio/visual signal indicates the cartridges to be exchanged. The heating coils 8 of both skillets 46 and 47, and the gearmotor 43 for the wire belt drive, continue operating.

After cartridges 1 are exchanged, the automatic process starts again when pressing the start button B2. The computer memory keeps track of the remaining services and continues the counting.

The grade of readiness of the potato pancakes can be adjusted by the two temperature controls TC1 and TC2 for both skillets independently, or by the speed control button R1 of the control panel, which regulates the speed of the gearmotor 43. The switch interval of clutch 11 is a function of the speed of gearmotor 43, while the number of intervals is given by the computer input (number of servings). A digital display in the control panel indicates the number of servings input and counts down the remaining services as a function of the microswitch S1 operation.

Cleaning the frying skillets 46 and 47 and changing the oil is a nonhazardous procedure. After the last programmed potato pancake leaves the apparatus, the gearmotors 13, 21, and 43 are stopped by pushing the cleaning button B3 at the control panel. Gearmotor 56 switches into reverse and starts, moving both frying skillets into the lower maintenance position.

As the skillets reach the lower position the microswitch S5 automatically switches off the gearmotor 56 and the heating coil power, and starts the compressor of the refrigerator unit 81 (FIG. 1) with a time delay of approximately five minutes for heating coil protection. The refrigerant liquid is pumped through the cooling coil 83 (FIG. 5) and cools the cooking oil below the hazardous temperature (max. 100 F).

The temperature control TC3 as a function of the sensors T1 or T2 causes the refrigerator unit 81 to switch off when the low oil temperature is reached. Only then the magnet locks ML (FIG. 7) at the maintenance doors 79 and 80 (FIG. 2) unlock and enable the removal of the frying skillets for cleaning purposes and oil exchange.

Following is a further description and identification of the motor and control components of the preferred embodiments of the invention.

| MOTOR AND CONTROL SCHEDULE | | |
| --- | --- | --- |
| SYMBOL | EQUIPMENT | FUNCTION |
| 13 | Gearmotor | Drive for pistons 4 |
| 21 | Gearmotor | Drive for knife 16 |
| 43 | Gearmotor | Drive for wire mesh belts 31, 45 |
| 56 | Gearmotor | Drive for frying skillets 46, 47 |
| 11 | Electro magnetic clutch | Piston drive in/out |
| 23 | Electro magnetic clutch | Knife drive in/out |
| T1 | Temperature sensor | 82 on/off, 81 off |
| T2 | Temperature sensor | 82 on/off, 81 off |
| SV | Solenoid valve | Cooking oil supply on/off |
| S1 | Microswitch | 11 in |
| S2 | Microswitch | 11 out, 23 in |
| S3 | Microswitch | 11 out |
| S4 | Microswitch | Signal on 13 reverse, 11 in, 23 out, 21 off |
| S5 | Microswitch | 56 on/off, 82 on/off, RC on/off, SV on/off |
| CP | Control Panel | Housing all controls that are marked with asterix (*) |
| CC1 *) | Computer | Input and count of services, 11 |

-continued

MOTOR AND CONTROL SCHEDULE

| SYMBOL | EQUIPMENT | FUNCTION |
|---|---|---|
| 82 | Heating coil | in Function of T1 on/off |
| B1 *) | Main switch | All power on/off |
| B2 *) | Start button | 13 on, 11 on, 21 on, 23 on |
| B3 *) | Cleaning button | 13 off, 21 off, 43 off, 56 on and reverse |
| R1 *) | Speed control | 43 and 11 slower/faster |
| TC1 *) | Temperature control | T1 lower/higher |
| TC2 *) | Temperature control | T2 lower/higher |
| TC3 *) | Temperature control | T1 and T2 at 100 degrees Farenheit |
| L1 *) | Red control light | All power on/off |
| L2 *) | Green control light | 82 on/off |
| L3 *) | Green control light | S1 on/off |
| L4 *) | Green control light | S2 on/off |
| L5 *) | Yellow control light | S3 on, Buzzer on and reset |
| L6 *) | Yellow blink light | 79 and 80 open |
| ML | Magnetic lock | Locks 79 and 80 |

*) Part of control panel CP

What is claimed is:

1. An apparatus for cooking pancakes, comprising:
   a first movable surface for transporting pancakes, which surface forms a course having at least three portions, the third portion of which is substantially vertical;
   means for placing a raw pancake upon the first movable surface at a first portion of its course, with the bottom side of the pancake facing the first movable surface;
   means for frying the pancake, operatively disposed adjacent to a second portion of the course of the first movable surface so as to cook the bottom side of the pancake;
   a second movable surface for transporting a pancake which forms a course having at least three portions, the first portion of which is substantially vertical and is juxtaposed to the third portion of the course of the first movable surface;
   means for removing the pancake from the first movable surface at the third portion of its course and placing the removed pancake upon the second movable surface, with the top side of the pancake facing the second movable surface;
   means for frying the pancake operatively disposed adjacent to the second portion of the course of the second movable surface so as to cook the top side of the pancake; and
   means for removing the cooked pancake from the third portion of the course of the second movable surface.

2. The apparatus of claim 1 wherein the first and second movable surfaces comprise endless wire mesh belts.

3. The apparatus of claim 2 wherein the removing and placing means comprises:
   a member adjacent to the first wire mesh belt, and above part of the second wire mesh belt, impeding the continued passage of a pancake on the first wire mesh belt but allowing it to be carried by the second wire mesh belt.

4. The apparatus of claim 3 wherein the juxtaposed portions of the two wire mesh belts are located above the impeding member and define a gap of a dimension less than the height of the pancake upon the first wire mesh belt whereby the pancake is held and transported by both wire mesh belts at the location of the gap.

5. The apparatus of claim 2 wherein the frying means each comprise:
   a skillet for holding cooking oil; and
   a heating coil operatively disposed for heating the cooking oil.

6. The apparatus of claim 5 further comprising:
   means for vertically adjusting the levels of the skillets relative to the second portions of the wire mesh belts adjacent to the skillets.

7. The apparatus of claim 5 further comprising:
   means for automatically maintaining a constant level of cooking oil within the skillets.

8. The apparatus of claim 7 further comprising means for cooling the skillets.

9. An apparatus for producing fired potato pancakes from raw potato pancake mixture contained in a cartridge, comprising:
   means for defining at least one heat source;
   means for pushing predetermined amounts of the mixture out of the cartridge;
   means for slicing portions of the pancake mixture pushed out of the cartridge away from the portion remaining in the cartridge;
   first control means for activating the slicing means only after a predetermined portion of the mixture has been pushed out of the cartridge;
   second control means for delaying activation of the pushing means for a predetermined amount of time after activation of the slicing means;
   means for moving the sliced pancake portions to a conveyor belt;
   means for moving the part of the conveyor belt carrying the pancakes through oil heated by the means for defining a heat source;
   means for transferring the heated pancakes to a second conveyor so that the side of the pancakes which rested upon the first conveyor faces away from the second conveyor;
   means for moving the part of the second conveyor carrying the heated pancake through heated oil; and
   means for removing the cooked pancakes from the second conveyor.

* * * * *

UNITED STATES PATENT AND TRADEMARK OFFICE
CERTIFICATE OF CORRECTION

PATENT NO. : 4,870,897
DATED : Oct. 3, 1989
INVENTOR(S) : Hindrich et al.

It is certified that error appears in the above-identified patent and that said Letters Patent is hereby corrected as shown below:

On the title page of the patent change the second named inventor's surname from "Knipscheer" to --Knippscheer-- and change the inventors' town of residence from "Baldwinrk" to --Baldwin--.

Signed and Sealed this

Twenty-first Day of May, 1991

Attest:

HARRY F. MANBECK, JR.

Attesting Officer

Commissioner of Patents and Trademarks